US009626220B2

(12) United States Patent
Mitran et al.

(10) Patent No.: US 9,626,220 B2
(45) Date of Patent: Apr. 18, 2017

(54) COMPUTER SYSTEM USING PARTIALLY FUNCTIONAL PROCESSOR CORE

(71) Applicant: International Business Machines Corporation, Armonk, NY (US)

(72) Inventors: Marcel Mitran, Markham (CA); K. Paul Muller, Wappingers Falls, NY (US); William J. Rooney, Hopewell Junction, NY (US); Joran S. C. Siu, Thornhill (CA); David S. Wolpert, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 14/595,465

(22) Filed: Jan. 13, 2015

(65) Prior Publication Data
US 2016/0203023 A1    Jul. 14, 2016

(51) Int. Cl.
*G06F 9/54* (2006.01)
*G06F 9/50* (2006.01)
*G06F 13/36* (2006.01)

(52) U.S. Cl.
CPC ............ *G06F 9/5011* (2013.01); *G06F 13/36* (2013.01)

(58) Field of Classification Search
CPC .............................. G06F 9/5011; G06F 13/36
See application file for complete search history.

(56) References Cited

U.S. PATENT DOCUMENTS

| | | | |
|---|---|---|---|
| 6,550,020 B1 | 4/2003 | Floyd et al. | |
| 7,111,196 B2 | 9/2006 | Balazich et al. | |
| 7,434,129 B2 | 10/2008 | Farnsworth, III et al. | |
| 7,487,420 B2 | 2/2009 | Keller | |
| 7,661,050 B2 | 2/2010 | Huben et al. | |
| 7,739,637 B2 | 6/2010 | Goodnow et al. | |
| 8,368,423 B2 | 2/2013 | Yancey et al. | |
| 8,381,004 B2 | 2/2013 | Elnozahy et al. | |
| 2005/0066079 A1* | 3/2005 | Luick .................. | G06F 11/2028 710/36 |

(Continued)

FOREIGN PATENT DOCUMENTS

EP    001037145 A2    9/2000

OTHER PUBLICATIONS

Kazuaki Ishizaki et al., "A Study of Devirtualization Techniques for a Java™ Just-In-Time Compiler", 2000 ACM.

(Continued)

*Primary Examiner* — Syed Roni
(74) *Attorney, Agent, or Firm* — Steven J. Meyers; Hoffman Warnick LLC

(57) ABSTRACT

A multiple processor core computer system interface assigns instructions to partially functional processor cores based on processing resources available in each partially functional core. Each processor core is labeled as fully functional, partially functional, or non-functional, and an indicator is provided for each partially functional processor core that shows what processing resources are available for a respective core. The indicators can be stored in memory after final test. The interface can monitor cores for changes in available resources and update respective indicators, such as by superseding an existing indicator with or creating a new indicator in read-write memory.

14 Claims, 6 Drawing Sheets

(56) References Cited

U.S. PATENT DOCUMENTS

| | | | |
|---|---|---|---|
| 2007/0226472 A1* | 9/2007 | Chaudhry | G06F 9/3842 712/227 |
| 2008/0115113 A1 | 5/2008 | Codrescu et al. | |
| 2012/0221884 A1* | 8/2012 | Carter | G06F 11/0772 714/2 |
| 2013/0047004 A1* | 2/2013 | Hwang | G06F 9/5094 713/300 |
| 2013/0326199 A1 | 12/2013 | Magklis et al. | |
| 2014/0157073 A1 | 6/2014 | Douskey et al. | |

OTHER PUBLICATIONS

Patel et al., "A Case for Instruction Subset Architectures (IsA): Guaranteeing Functionality in High Defect Rate Technologies", ASPLOS 2011.

Anderson et al., "The World of z/OS Dispatching on the zEC12 Processor", Summer SHARE 2013, Session 14040, IBM Corporation 2013.

* cited by examiner

COMPUTER SYSTEM USING PARTIALLY FUNCTIONAL PROCESSOR CORE

BACKGROUND

The present application relates generally to an improved data processing apparatus and method and more specifically to interfaces for assigning tasks in a multi-core, multi-threaded processor system to take advantage of processing resources available in partially failed and partially functional processor cores.

Modern data processing or computer systems typically include a plurality of processor cores. In some modern data processing systems, each processor core is multithreaded where multiple hardware-supported threads can be executed in parallel within the processor core. The number of threads depends on the design of the processor core and usually presents a tradeoff between efficient utilization of processor core resources on one hand, and the requirements on the pipeline, cache size, and memory bandwidth on the other hand.

In such computer systems, operating system software can assign instructions from application tasks to the various hardware threads or processing resources available. Depending on the workload, the user or system administrator can also instruct the operating system to use only a specific number of hardware threads within a particular processor core to run particular application tasks, leaving the remaining hardware threads idle. However, available processing resources are determined based on the identification of processor cores as "good" or "bad/failed," with bad or failed processor cores not receiving any instructions. Energy consumption is another important consideration, and even failed processor cores consume power and generate heat. Even if the clocks are turned off, failed processor cores consume leakage current and thus generate heat. In processors that provide dynamic voltage and frequency scaling (DVFS), the selection of the frequency of each processor core enables the user to fine-tune the tradeoff between performance and energy consumption. This may relieve some of the additional power consumption caused by malfunctioning cores if the DVFS system is functioning properly for that core, but the malfunctioning core's code execution capabilities are lost under current schemes.

In many cases, bad or failed cores still have processing resources that could be used. This depends on the nature of the failure, but since each core includes a plurality of execution units and other components, failure of one or more units that can label the core as bad or failed does not mean that all execution units have failed. Thus, processing resources that could be used wind up wasting power and heating up the computer system. The problem is how to schedule application tasks on the available processor cores, even partially functional cores, so as to better balance performance and energy consumption.

SUMMARY

In one illustrative embodiment, a computer system can include a plurality of processor cores coupled to a system interconnect. Each processor core can have processing resources including a plurality of execution units. The computer system can also include a system memory, a memory controller coupled to the system memory, and a memory interface unit coupled to the memory controller and the system interconnect. A system interface coupled to the system interconnect can determine a status of each processor core, the status including one of fully functional, partially functional, or non-functional, and can determine available processing resources for any partially functional processor core. A current instruction can be received by the system interface via the memory interface, and the system interface can determine what processing resources are needed to process the current instruction. The current instruction can be assigned to a partially functional processor core based on at least processor core status, processing resources needed, and available processing resources.

In other illustrative embodiments, a method can include reading information about each of a plurality of processor cores in a computing device. The information can include an indicator of functionality, the indicator showing its respective processor core is one of fully functional, partially functional, or non-functional, and, for any partially functional core, a respective indicator of available processing resources. A current instruction can be received from a memory of the computing system, and processing resources needed to process the current instruction can be determined. The current instruction can be assigned to a partially functional processor core based on at least the read information and the needed processing resources.

In yet another illustrative embodiment, a system interface for a computer system having a plurality of processor cores can include a first circuit connected to a memory interface of the computer system. The memory interface can be coupled to a system memory of the computer system so that the first circuit can receive a current instruction of a task stored in the system memory, as well as a respective status indicator stored in the system memory, each status indicator indicating that the respective processor core is one of fully functional, partially functional, and non-functional. The first circuit can further receive, for each partially functional processor core, a respective indicator of available processing resources stored in the system memory. The system interface can also include a second circuit connected to the first circuit to determine what processing resources are needed to process the current instruction and a third circuit connected to each of the plurality of processor cores. A fourth circuit of the system interface can be connected to the first, second, and third circuits such that the fourth circuit can assign the current instruction received via the first circuit to a partially functional processor core via the third circuit in response to at least the needed processing resources, the status indicators, and at least one available processing resources indicator received through the first circuit.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
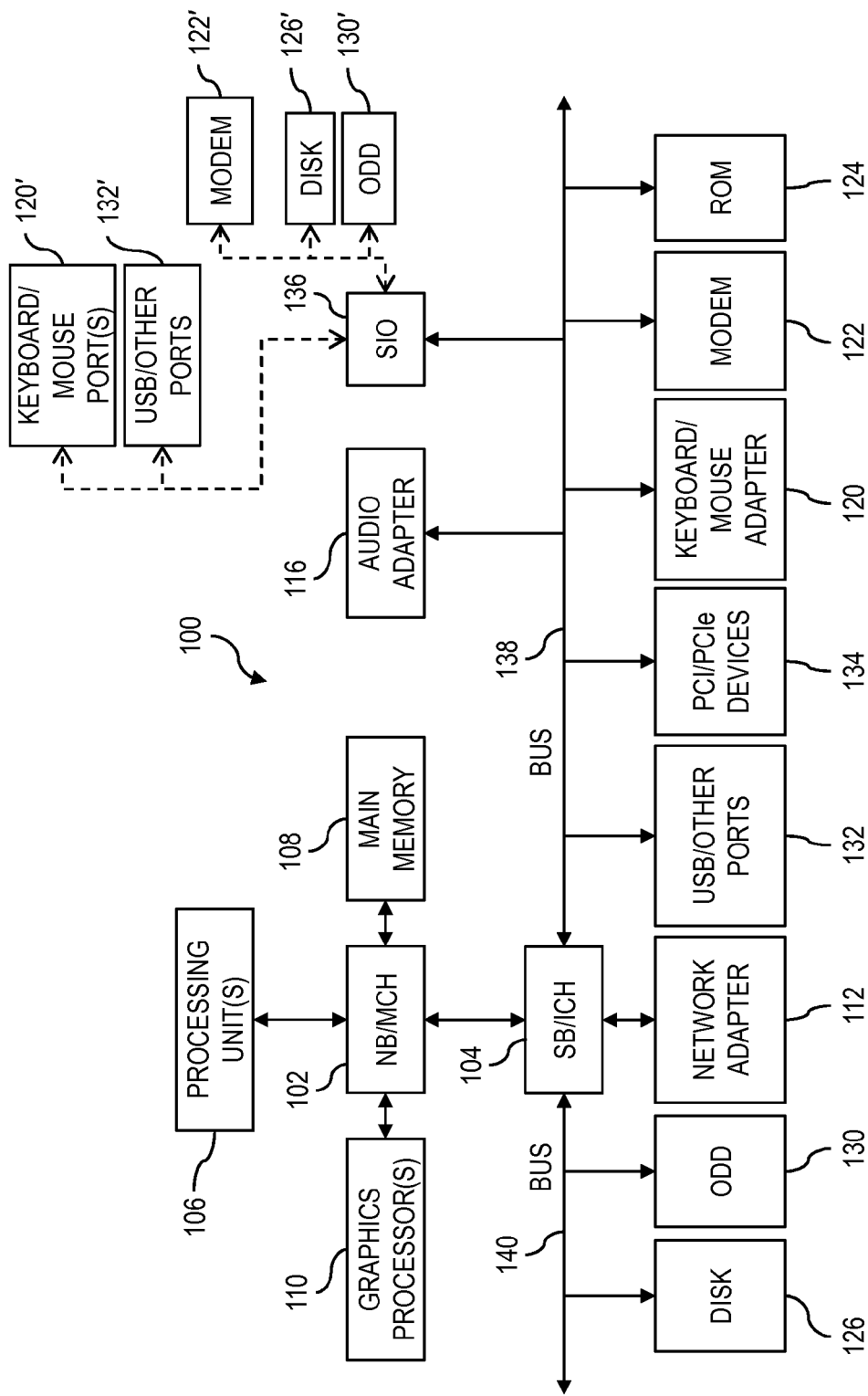
FIG. 1 shows an exemplary data processing system in which aspects of the illustrative embodiments may be implemented.

The illustrative embodiments provide a mechanism for assigning instructions from application tasks to partially functional processor cores in a computer system to improve the balance between system throughput, application performance, and energy consumption. Embodiments expand existing techniques identifying processor cores that fail final test so that, rather than avoiding usage of all failed cores, failed cores that still have usable processing resources can be identified and included in system operations. Using available resources in failed cores can increase effective manufacturing yield, and operation can be maintained in the event of loss of processing resources. Embodiments can be implemented in core controllers, OS dispatchers/schedulers, and/or in virtualization-enabling hypervisors, while other embodiments can be implemented using just-in-time (JIT) compilers or the like.

Energy consumption and tuning performance are considerations for scheduling application processes on available hardware threads. There may be a desire to run a particular workload to obtain the desired performance while minimizing the energy used. Or, there may be a desire to run a particular workload within a fixed energy budget while maximizing performance. The tradeoff between energy and performance is generally difficult and depends on the server system, application workload, and the user's expectation of performance and energy consumption. An element of this tradeoff is the frequency at which the application task should run. Many processors allow dynamic voltage and frequency scaling (DVFS) in which the frequency of each processor core can be selected by the user to fine-tune the tradeoff between performance and energy consumption. However, the minimum unit for frequency selection is typically a processor core. Another significant element of this tradeoff arises when one or more processor cores have been labeled as "failed" or "bad" and are not used despite drawing power and generating heat. Processor cores that have functional execution units but have been labeled as bad or failed languish completely unused.

The problem becomes, given a computer system or processor with a particular number of cores, say C cores, where a subset F of these C cores are labeled as failed cores, how instructions can be assigned to one of the F cores to take advantage of whatever processing resources might be functional. Embodiments provide an expanded indication of core status so that a core can be good, failed, or partially failed, or, put another way, a core can be fully functional, partially functional, or non-functional. Thus, one or all of the F cores may instead be part of a subset P of partially functional cores. For those P cores identified as partially functional, embodiments provide an indicator of available processing resources for each partially functional core. For example, if a core has a failed fixed point execution unit but still has a functioning floating point unit, embodiments provide an indication of this remaining functionality. A system interface is introduced in embodiments that assigns a current instruction to a core based on workload of the C cores, available processing resources in the P cores, and the nature of the instruction. Where an instruction is of a first type and an available P core does not have a suitable execution unit or other processing resource, embodiments can include a translator, such as a just-in-time (JIT) compiler that can convert a current instruction into one or more converted instructions compatible with the available P core.

Figure 2:
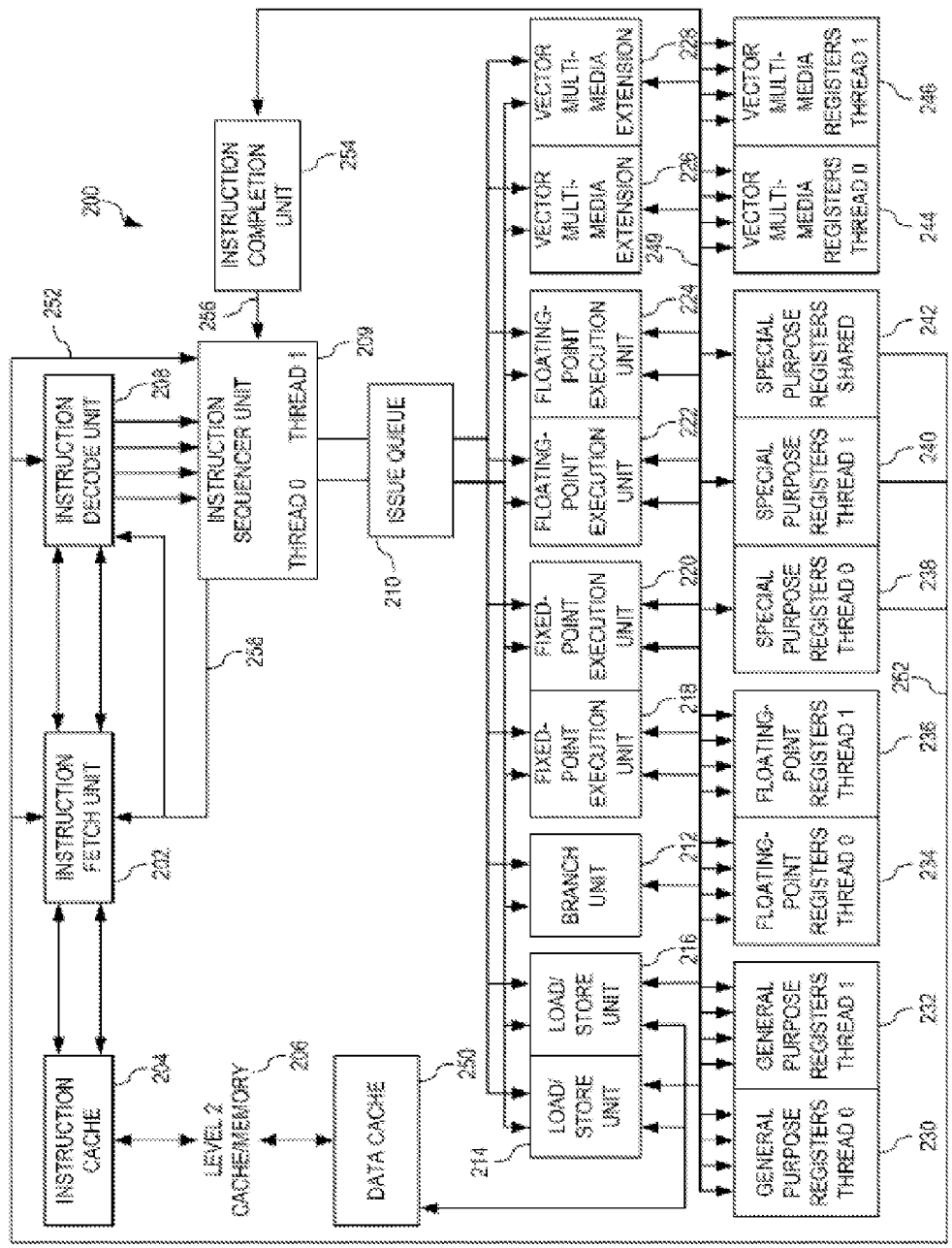
FIG. 2 depicts an exemplary block diagram of a dual-threaded processor core design showing functional units and registers in accordance with an illustrative embodiment.

FIGS. 1 and 2 show example environments in which aspects of the illustrative embodiments can be implemented. While the description following FIGS. 1 and 2 focus primarily on a single multiple core processor implementation for scheduling tasks and/or assigning instructions, this is only an example and is not intended to state or imply any limitation with regard to the features of the present invention. An additional example of a computing environment in which embodiments of the invention disclosed herein can be implemented is disclosed in U.S. Pat. No. 8,381,004, which is incorporated by reference in its entirety and portions of which are included below and in the FIGS.

With reference now to FIGS. 1-2, a data processing system 100 is an example of a computer system in which components, circuits, and/or computer-usable/-executable code or instructions implementing the processes of embodiments of the invention disclosed herein can be located. In the depicted example, data processing system 100 can employ a hub architecture including north bridge and memory controller hub (NB/MCH) 102 and south bridge and input/output (I/O) controller hub (SB/ICH) 104. Processing unit 106, main memory 108, and graphics processor 110 can be connected to NB/MCH 102. Graphics processor 110 can be connected to NB/MCH 102 through an accelerated graphics port (AGP) or the like. A local area network (LAN) adapter 112 can connect to SB/ICH 104, and an audio adapter 116, keyboard and mouse adapter 120, modem 122, read only memory (ROM) 124, hard disk drive (HDD) 126, optical disc drive (ODD) 130, universal serial bus (USB) ports and other communication ports 132, and PCI/PCIe devices 134 can connect to SB/ICH 104 through bus 138 and bus 140. ODD 130 can include a CD-ROM or -RAM drive, a DVD-ROM or -RAM drive, a Bluray drive, or any other suitable optical disc drive. PCI/PCIe devices can include, for example, Ethernet adapters, add-in cards, and PC cards for notebook computers. PCI uses a card bus controller, while PCIe does not. ROM 124 can be, for example, a flash basic input/output system (BIOS).

HDD 126 and ODD 130 can connect to SB/ICH 104 through bus 140. HDD 126 and CD-ROM drive 130 can use, for example, an integrated drive electronics (IDE) or serial advanced technology attachment (SATA) interface. In addition, a super I/O (SIO) device 136 can be connected to SB/ICH 104 via bus 138 to provide connectivity to keyboard/mouse ports 120', disk port(s) 126', USB and/or other ports 132', such as serial and/or parallel ports, and/or other I/O ports as may be desired. Where SIO 136 is employed, the ports it provides can be in addition to those provided elsewhere or can replace like ports depicted in FIG. 1. Thus, where SIO 136 is employed to provide keyboard and mouse ports 120', keyboard and mouse adapter 120 can be eliminated or connected via SIO 136, as can USB and other ports 132, disk 126, ODD 130, and/or any other suitable ports depicted in FIG. 1.

An operating system can run on processing unit(s) 106 and can coordinate and provide control of various components within data processing system 100 in FIG. 1. The operating system can be any suitable operating system, such as, but not limited to, IBM® Advanced Interactive Executive (AIX®), Microsoft® Windows®, Apple MacOSX®, and/or LINUX®. In addition, a programming system, such as an object-oriented programming system like the Java™ programming system or a procedural programming language like C, can run in conjunction with the operating system and can provide calls to the operating system from programs or applications of the programming system executing on data processing system 100. (AIX is a trademark of International Business Machines Corporation in the United States, other countries, or both, Microsoft and Windows are trademarks of Microsoft Corporation in the United States, other countries, or both, Apple and MacOSX are trademarks of Apple Computer, Inc., in the United States, other countries, or both, Java is a trademark of Sun Microsystems, Inc., in the United States, other countries, or both, and LINUX is a trademark of Linus Torvalds in the United States, other countries, or both.)

As a server, data processing system 100 can be, for example, an IBM® System p® or an IBM® System z® computer system, running AIX® or LINUX® (System p and System z are trademarks of International Business Machines Corporation in the United States, other countries, or both). Data processing system 100 can be a symmetric multiprocessor (SMP) system including a plurality of processors in processing unit 106. For example, processing unit 106 could include a plurality of multi-core processor chips connected via multi-chip module (MCM) links. Alternatively, a single processor system can be employed. Each processor can include multiple cores, which can each include multiple execution units or other processing resources as will be explained below.

Instructions for the operating system, the programming system, and applications or programs can be located on non-transitory computer readable storage media in storage devices, such as disk 122, ROM 124, HDD 126, ODD 130, and/or other storage devices, and can be loaded into main memory 108 for execution by processing unit(s) 106. The processes of embodiments of the invention disclosed herein can be performed by processing unit(s) 106 using computer usable program code, which can be located in a memory such as, for example, main memory 108, ROM 124, or in one or more peripheral devices, such as HDD 126 and ODD 130, for example, or any other non-transitory computer readable storage medium or device. A memory can include, for example, in addition to main memory 108 and ROM 124, one or more RAM devices or a cache memory as part of NB/MCH 102 in FIG. 1.

A bus system, such as bus 138 and/or bus 140 as shown in FIG. 1, can include one or more buses and can be implemented using any type of communication architecture that provides for a transfer of data between different components or devices attached to the fabric or architecture. A communication unit, such as modem 122 or network adapter 112 of FIG. 1, can include one or more devices used to transmit and receive data.

Those of ordinary skill in the art will appreciate that the hardware in FIG. 1 may vary depending on the implementation. Other internal hardware or peripheral devices, such as flash memory, equivalent non-volatile memory, solid state drives (SSDs), or optical disc drives and the like, may be used in addition to or in place of the hardware depicted in FIG. 1. Also, the processes of the illustrative embodiments can be applied to a multiprocessor data processing system without departing from the spirit and scope of the present invention. Moreover, data processing system 100 can take the form of any of a number of different data processing systems including client computing devices, server computing devices, a tablet computer, laptop computer, telephone or other communication device, a personal digital assistant (PDA), a smartphone, or the like. In some embodiments, data processing system 100 can be a portable computing device configured with flash memory to provide non-volatile memory for storing operating system files and/or user-generated data, for example. Essentially, data processing system 100 may be any known or later developed data processing system without architectural limitation.

With data processing system 100 of FIG. 1, processing unit 106 can have facilities for processing both integer and floating-point instructions and operating on both types of data. However, in accordance with the illustrative embodiments, processing unit 106 can have hardware facilities for handling SMP instructions and data as floating-point only SMP instructions and data. The scalar facilities are used for integer processing, and in conjunction with the floating-point only SMP architecture for internal loop control and memory access control.

Referring to FIG. 2, an exemplary block diagram of a dual-threaded processor core design showing functional units and registers is depicted in accordance with an illustrative embodiment. Processor core 200 can be implemented in a processor, such as processing unit 106 in FIG. 1, in these illustrative examples. Processor core 200 can comprise a single integrated circuit superscalar microprocessor with dual-thread simultaneous multi-threading (SMT) that may also be operated in a single-threaded mode. Accordingly, as discussed further herein below, processor core 200 can include various units, registers, buffers, memories, execution units, and other sections, all of which can be formed by integrated circuitry. Also, in an illustrative embodiment, processor core 200 can operate according to reduced instruction set computer (RISC) techniques.

As shown in FIG. 2, an instruction fetch unit (IFU) 202 can connect to an instruction cache 204. Instruction cache 204 can hold instructions for multiple programs (threads) to be executed. Instruction cache 204 can also include an interface to level 2 (L2) cache/memory 206. IFU 202 can request instructions from instruction cache 204 according to an instruction address, and can pass instructions to instruction decode unit 208. In an illustrative embodiment, IFU 202 can request multiple instructions from instruction cache 204 for up to two threads at the same time. Likewise, instruction decode unit 208 can decode multiple instructions for one or more threads at the same time and can pass decoded instructions to instruction sequencer unit (ISU) 209.

Processor core 200 can also include issue queue 210, which can receive decoded instructions from ISU 209. Instructions can be stored in issue queue 210 while awaiting dispatch or assignment to appropriate execution units. For an out-of order processor to operate in an in-order manner, ISU 209 can selectively issue instructions quickly using false dependencies between each instruction. If an instruction does not produce data, such as in a read after write dependency, ISU 209 can add an additional source operand (also referred to as a consumer) per instruction to point to the previous target instruction (also referred to as a producer). Issue queue 210, when issuing the producer, can then wakeup the consumer for issue. By introducing false dependencies, a chain of dependent instructions can be created such that the instructions can be issued in-order. ISU 209 can use the added consumer for instruction scheduling purposes and the instructions, when executed, need not actually use the data from the added dependency. Once ISU 209 selectively adds any required false dependencies, issue queue 210 can take over and can issue the instructions in order for each thread, and can output or issue instructions for each thread to execution units 212, 214, 216, 218, 220, 222, 224, 226, and 228 of the processor. This process will be described in more detail in the following description.

In an illustrative embodiment, the execution units of the processor can include branch unit 212, load/store units (LSUA) 214 and (LSUB) 216, fixed-point execution units (FXUA) 218 and (FXUB) 220, floating-point execution units (FPUA) 222 and (FPUB) 224, and vector multimedia extension units (VMXA) 226 and (VMXB) 228. Execution units 212, 214, 216, 218, 220, 222, 224, 226, and 228 can be shared fully across both threads, meaning that execution units 212, 214, 216, 218, 220, 222, 224, 226, and 228 can receive instructions from either or both threads. The processor can include multiple register sets 230, 232, 234, 236, 238, 240, 242, 244, and 246, which can also be referred to as architected register files (ARFs).

An ARF is a file where completed data is stored once an instruction has completed execution. ARFs 230, 232, 234, 236, 238, 240, 242, 244, and 246 can store data separately for each of the two threads and by the type of instruction, namely general purpose registers (GPRs) 230 and 232, floating-point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally can include a set of shared special purpose registers (SPR) 242 for holding program states, such as an instruction pointer, stack pointer, or processor status word, which can be used on instructions from either or both threads. Execution units 212, 214, 216, 218, 220, 222, 224, 226, and 228 can be connected to ARFs 230, 232, 234, 236, 238, 240, 242, 244, and 246 through a simplified internal bus structure 249.

To execute a floating-point instruction, FPUA 222 and FPUB 224 can retrieve register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs. For example, FPUA 222 can input completed data to FPR 234 and FPUB 224 can input completed data to FPR 236, because FPUA 222, FPUB 224, and FPRs 234 and 236 are thread specific.

During execution of an instruction, FPUA 222 and FPUB 224 can output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 can output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 can output their destination register operand data to SPRs 238, 240, and 242 when the instruction has passed the point of flushing in the pipeline. Program states, such as an instruction pointer, stack pointer, or processor status word, stored in SPRs 238 and 240 can indicate thread priority 252 to ISU 209. During execution of an instruction, VMXA 226 and VMXB 228 can output their destination register operand data to VRs 244 and 246 when the instruction has passed the point of flushing in the pipeline.

Data cache 250 can also have associated with it a non-cacheable unit (not shown) which can accept data from the processor and write it directly to level 2 cache/memory 206. In this way, the non-cacheable unit can bypass coherency protocols that may be imposed for storage to cache.

In response to the instructions input from instruction cache 204 and decoded by instruction decode unit 208, ISU 209 can selectively dispatch the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 can execute one or more instructions of a particular class or type of instructions. For example, FXUA 218 and FXUB 220 can execute fixed-point mathematical operations on register source operands, such as addition, subtraction, ANDing, ORing and XORing, while FPUA 222 and FPUB 224 can execute floating-point mathematical operations on register source operands, such as floating-point multiplication and division. Additionally, LSUA 214 and LSUB 216 can execute load and store instructions, which move operand data between data cache 250 and ARFs 230, 232, 234, and 236, and VMXA 226 and VMXB 228 can execute single instruction operations that include multiple data. Further, branch unit 212 can execute branch instructions which conditionally alter the flow of execution through a program by modifying the instruction address used by IFU 202 to request instructions from instruction cache 204.

Instruction completion unit 254 can monitor internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. In some implementations, instructions executed by branch unit 212, FXUA 218, FXUB 220, LSUA 214, and LSUB 216 may require the same number of cycles to execute, while instructions executed by FPUA 222, FPUB 224, VMXA 226, and VMXB 228 may require a variable, larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 can monitor for the completion of instructions, and can send control information 256 to ISU 209 to notify ISU 209 that more groups of instructions can be dispatched to execution units 212, 214, 216, 218, 220, 222, 224, 226, and 228. ISU 209 can send dispatch signal 258, which serves as a throttle to bring more instructions down the pipeline to the dispatch unit, to IFU 202 and instruction decode unit 208 to indicate that it is ready to receive more decoded instructions. While processor core 200 provides one detailed description of a single integrated circuit superscalar microprocessor with dual-thread simultaneous multi-threading (SMT) that may also be operated in a single-threaded mode, the illustrative embodiments are not limited to such microprocessors. That is, the illustrative embodiments may be implemented in any type of processor which provides multi-threaded operation, whether this be two simultaneous threads (SMT2), four simultaneous threads (SMT4), or more simultaneous threads.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system without departing from the spirit and scope of the present invention.

With regard to the illustrative embodiments, the data processing system can include one or more processor cores, each having at least one hardware thread, where each of these hardware threads may run tasks independently of the other thread(s). In some cases, the hardware threads may compete among themselves for the available core resources, such as pipeline slots, queues, buffers, core's cache memory, and core's memory bandwidth. Such competition may degrade the applications' individual performances, although it may utilize the core resources to the maximum. In some cases, the data processing system can operate at reduced frequency and voltage levels, which in turn can reduce energy consumption. For example, a system with cores that allow dynamic voltage and frequency scaling (DVFS) can be operated in a manner to allow the data processing system to trade potentially lower performance in return for lower energy consumption by reducing the operating frequency and voltage. Processor cores operating at higher voltage and frequencies generally consume more power than operating at lower voltage and frequencies. Power consumption is a non-linear function of voltage and frequency. Thus, according to illustrative embodiments, using processor cores at lower frequencies may yield a good tradeoff between performance and energy consumption.

In the illustrative embodiments, a user application may run one or more tasks, each including a plurality of instructions. Each task has a desired maximum number of competing threads $t_a$ that specifies the maximum number of threads that could be running on the core without seriously degrading the task's individual performance. The task's performance will likely degrade with increasing the number of threads running on the same core beyond $t_a$.

Figure 3:
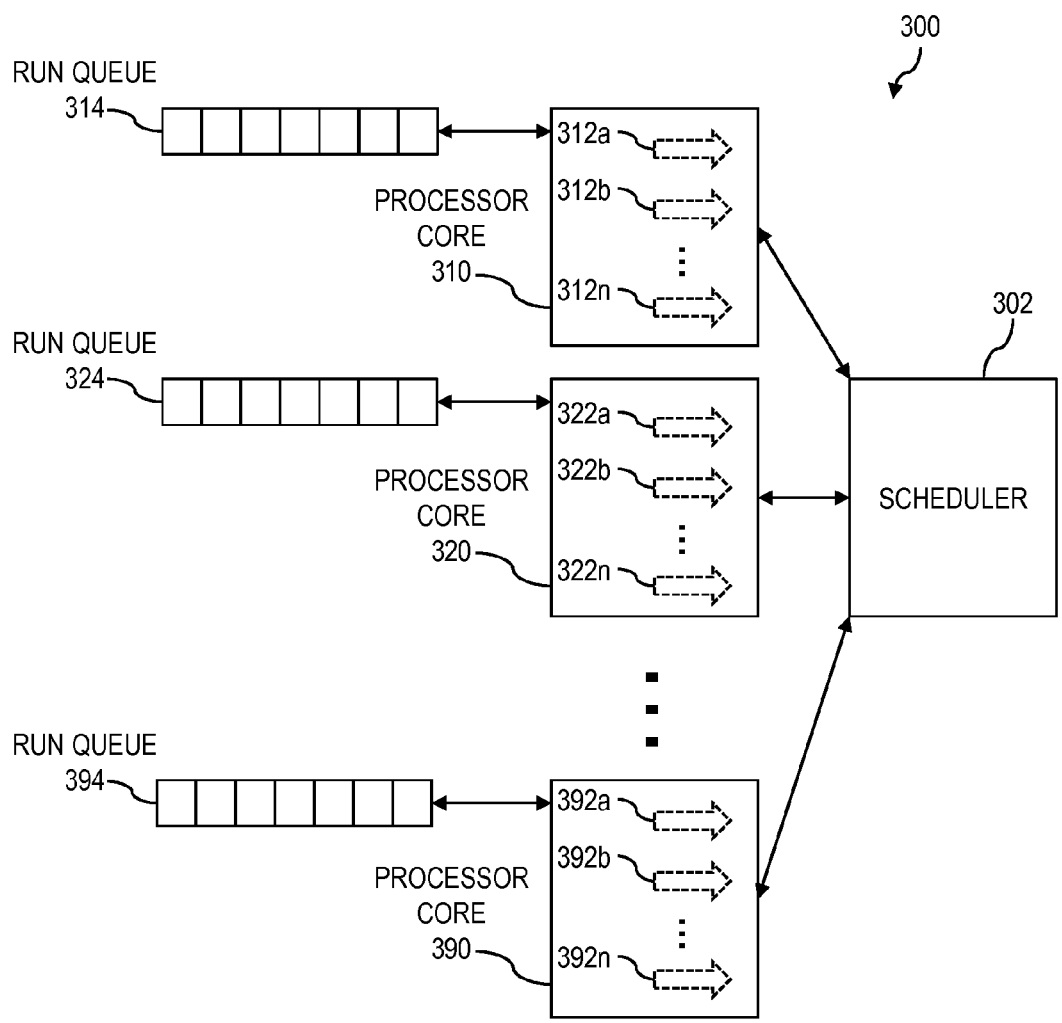
FIG. 3 depicts an exemplary data processing system with a plurality of processor cores in accordance with an illustrative embodiment.

Referring to FIG. 3, an exemplary data processing system is depicted with a plurality of processor cores in accordance with an illustrative embodiment. Data processing system 300 can include scheduler 302 and processor cores 310, 320, . . . , 390. Processor cores 310-390 can be implemented on a single chip or can be implemented on various processor chips. Each of processor cores 310-390 can include several hardware threads 312a-312n, 322a-322n, and 392a-392n, respectively. Each of hardware threads 312a-312n, 322a-322n, and 392a-392n can run application tasks independently, and each of hardware threads 312a-312n, 322a-322n, and 392a-392n can include all resources needed to store the state of the software thread that is dispatched by the operating system to run on the hardware thread, such as that depicted in FIG. 2. Hardware threads 312a-312n, 322a-322n, and 392a-392n compete among themselves for the computational and communication resources available on the processor core. For example, they compete for the pipelines, data paths to caches, and overall communication bandwidth. Data processing system 300 can also include run queues 314, 324, and 394 corresponding to processor cores 310, 320, and 390, respectively. Run queues 314, 324, and 394 are typically stored in the system memory and are managed by the operating system to ensure proper management of the processor cores 310-390.

In the illustrative embodiments, scheduler 302 can compute specific performance characteristics for each of run queues 314, 324, and 394. To express the size of the work that is queued in a particular one of run queues 314, 324, or 394, scheduler 302 can divide the length of the $n_m$ queue by the number of active hardware threads on the respective one of processor cores 310, 320, or 390. This value, referred to as a load coefficient, gives an indication for the amount of waiting that tasks will experience according to queuing theory. For example, four tasks queued on a processor core that has two active hardware threads will experience more waiting on average than five tasks queued on a processor core that has three active hardware threads. Furthermore, scheduler 302 can designate a threshold below which it is acceptable to add more tasks to the run queue. Scheduler 302 can consider a processor core having a load coefficient at or below this threshold to not be overloaded, whereas scheduler 302 can consider a processor core having a load coefficient above this threshold to be overloaded and ignores the processor core as a candidate for admitting more tasks unless data processing system 300 is experiencing large overload conditions. The threshold may be a user-defined value that is workload-dependent, environment-dependent, or a product of any appropriately user-defined factors, such as desired response time, system utilization caps, or the like. Scheduler 302 can assign tasks based on performance and/or power conservation, such as is described in U.S. Pat. No. 8,381,004 incorporated by reference above. Typically, scheduler 302 will ignore any processor core labeled as failed. That is, scheduler 302 reads from memory indicators of core status, which in prior art systems can include good or failed.

Figure 4:
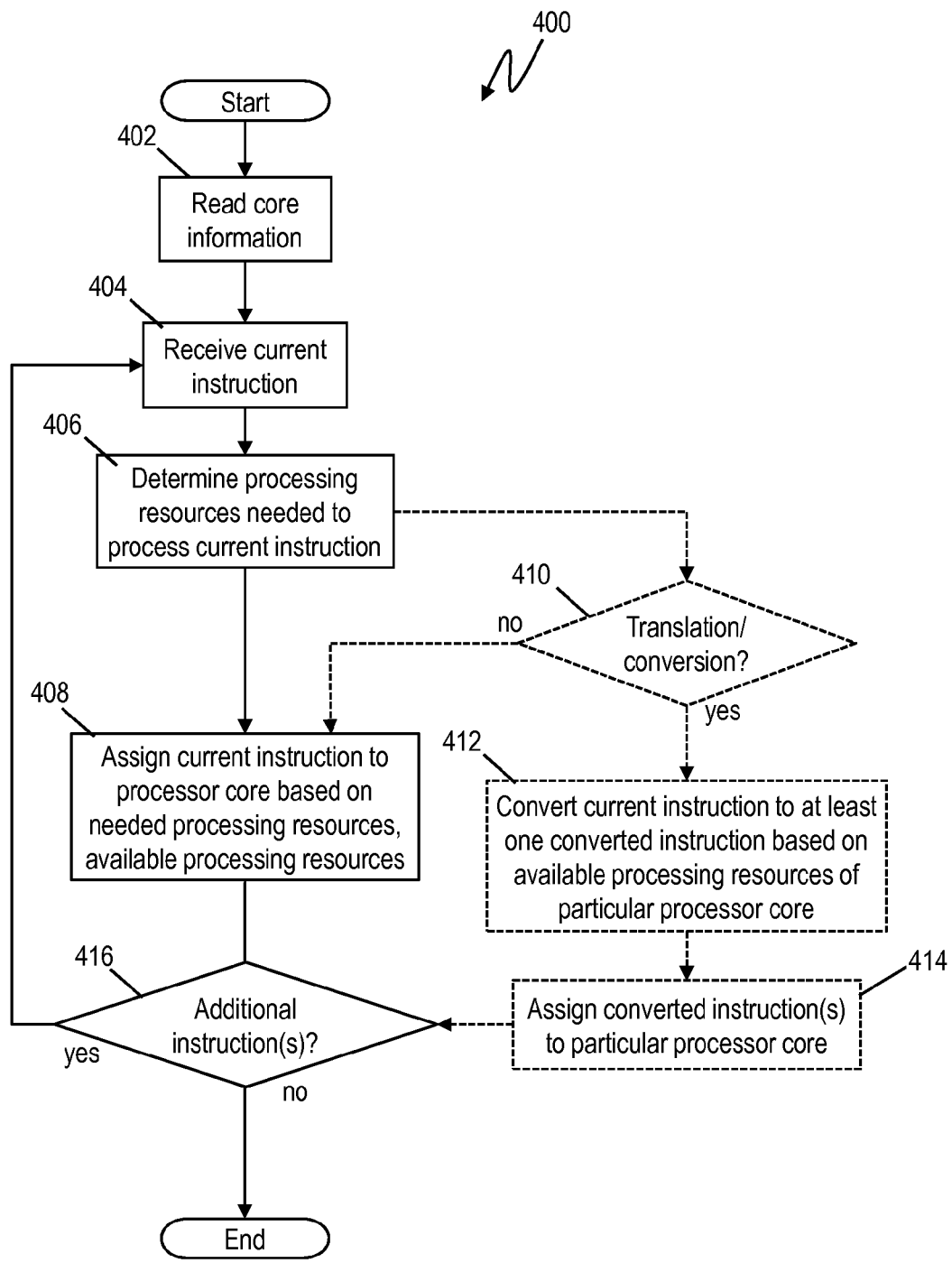
FIG. 4 depicts an exemplary operation performed by a scheduler and/or an interface in assigning a current instruction to one a plurality of processor cores in accordance with an illustrative embodiment.

Embodiments expand the processor core status indicators to allow states of fully functional, partially functional, and non-functional, and to indicate what resources are available in any partially functional core. Scheduler 302 can then use these indicators to evaluate tasks and assign tasks to compatible cores and to route tasks to corresponding ones of run queues 314, 324, or 394. For example, if scheduler 302 determines that all fully functional cores are above the threshold workload, it can route a current task to a partially functional core that has compatible resources available. While embodiments can be incorporated into scheduler 302, it should be clear that embodiments can instead be implemented as a separate interface. Other embodiments can be implemented in computing systems employing virtualization, where a hypervisor or the like can interact with one or more hosted operating systems. More specifically, a hypervisor in embodiments can assign instructions in a manner much the same as scheduler 302, but a hypervisor can also create logical partitions (LPARs) according to available processing resources. That is, if a hypervisor supervises hardware with a plurality of cores having failed floating point units, for example, all of these cores can be collected into a single LPAR. Likewise, all cores having failed sort engines, for example, can be collected into a single LPAR, all cores having failed encryption engines can be collected into a single LPAR, etc. In any implementation, embodiments include a method of task assignment, an example of which is shown in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 4, a task assignment method 400, such as can be performed by a scheduler, dispatcher, or hypervisor of a computing system, individual processor cores, and/or a master core of a group of processor cores, can read core information (block 402), such as from a memory device. For example, it is common to perform a final test on completed computing devices and to record certain information from the results of the test on the computing device in a ROM or the like, and in embodiments this information can include indicators of processor core status and available resources in partially functional cores. A current instruction can be received (block 404). The current instruction can be evaluated to determine what resources are needed to process the instruction (block 406). Based on the core information and the evaluation of the current instruction/needed processing resources, the current instruction can be assigned to a processor core (block 408). In embodiments, if a processor core is available that does not have processing resources compatible with the current instruction, but if using the incompatible processor could provide an efficiency the current instruction can be converted and assigned to the core. Thus, a determination can be made as to whether translation or conversion should be performed (block 410), which can include an estimate of processing time with and without using the otherwise incompatible partially functional core. If yes, then the current instruction can be converted to at least one converted instruction compatible with the available processor core (block 412) and assigned thereto (block 414), shown in dashed lines to indicate that this is an option. Conversion can be performed, for example, using a just-in-time compiler, emulation, or by any other suitable method, program, or device, and criteria other than unavailability of fully functional processor cores can be used as may be desired and/or appropriate. If no conversion or translation should be performed, then method 400 can proceed with block 408. Once the current instruction is assigned, a determination can be made as to whether there is an additional instruction to be assigned (block 416). If no additional instructions are to be assigned, the method can end, while if there are additional instructions, blocks 404-416 can be repeated.

Figure 5:
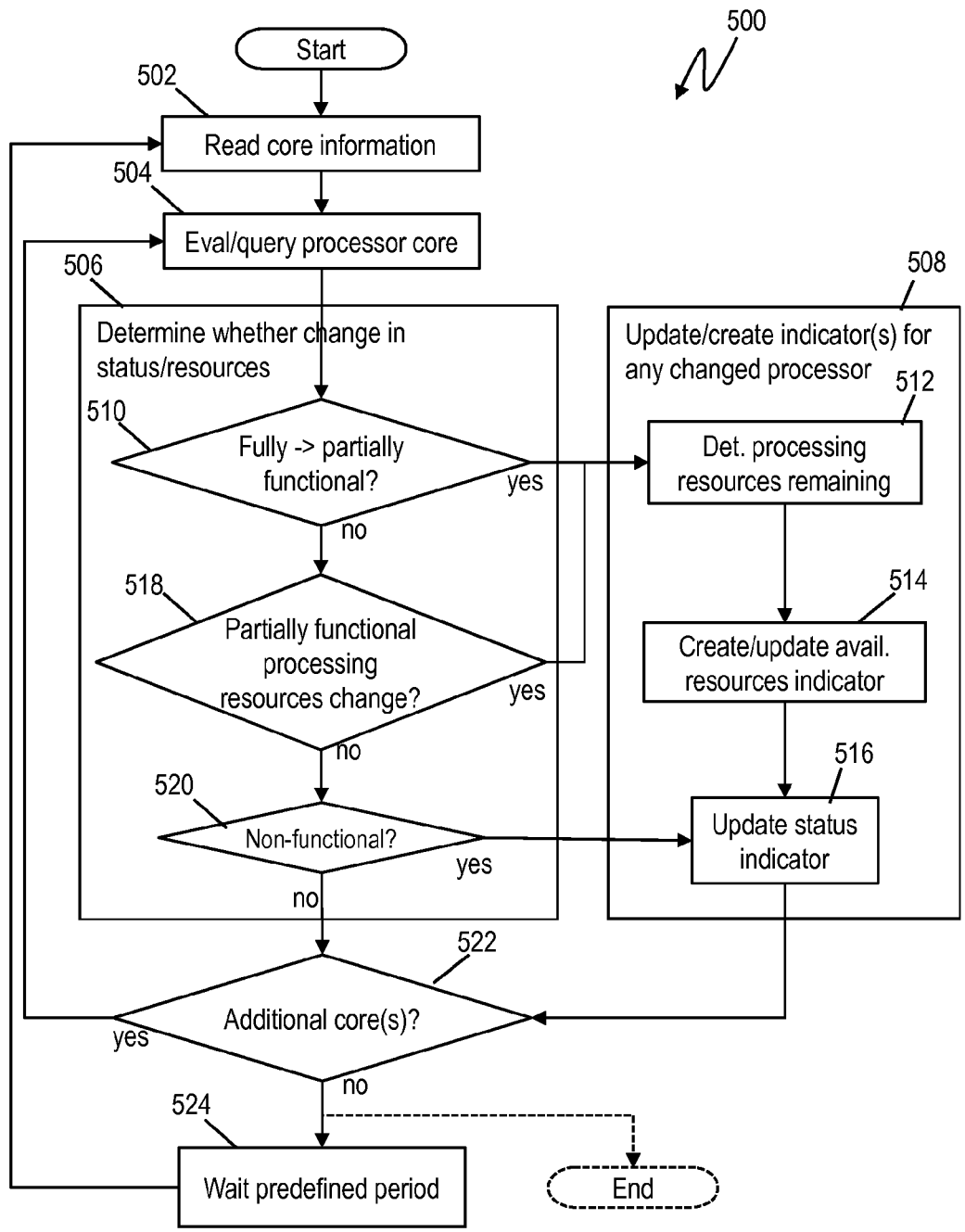
FIG. 5 depicts an exemplary operation performed by a scheduler and/or interface in monitoring a plurality of processor cores for changes in available processing resources and/or functionality in accordance with an illustrative embodiment.

In other embodiments, as seen in FIG. 5, processor core functionality monitoring can be performed, such as by a core controller, a master core, a scheduler, a dispatcher, a hypervisor, or another suitable control component of a computing system, and/or any combination of such control components as will be appreciated by one of skill in the art. Thus, a task assignment method 500 can read core information (block 502), such as from a memory device. For example, it is common to perform a final test on completed computing devices and to record certain information from the results of the test on the computing device in a ROM or the like, and in embodiments this information can include indicators of processor core status and available resources in partially functional cores. During an initial run or first repetition of the method, the information represents initial information that can be copied from read-only or other memory to read-write or other memory to allow updating and creation of indicators and subsequent iterations or runs or repetitions can instead read the copied and/or updated/new indicators/information. A functional evaluation or query can be performed for each functional and/or partially functional processor core (block 504) and a determination can be made as to whether any processor core has had a change in available resources and/or status (block 506). In embodiments, this can include a processor core conducting a self-test and sending an interrupt or notification to the monitoring program or device with any change in available processing resources or functionality. For any processor core with a change in status and/or available resources, status and/or available resources indicators can be updated or created (block 508). That is, if a fully functional processor core becomes partially functional (block 510), its remaining available resources can be determined (block 512), its available resources indicator can be created (block 514), and its status indicator can be updated (block 516), while if a partially functional processor core has a change in its available resources (block 518), its remaining available resources can be determined (block 512), its respective available resources indicator can be updated (block 514), and its status indicator can be updated (block 516), though in embodiments the status indicator for a changed partially functional core can be left unchanged. If any processor core becomes non-functional (block 520), its status indicator is updated accordingly (block 516), such as to indicate the processor core is non-functional. If an additional core remains to be evaluated (block 522), then blocks 504-522 can be repeated. If no additional core remains as determined in block 522, then blocks 504-522 can be repeated after a predefined period (block 524) to ensure the status and available resources information is current, or the method can end until an external trigger starts the method again.

Hardware implementations according to embodiments can include performance of method 400 and/or method 500 by each processor core of a computing system and/or by a master core of a group of cores. For example, a multiple core computing system can include a master/slave core setup in which the master core can perform preliminary instruction filtering in hardware before distributing instructions to the various processing units and can convert any instructions whose assignment to a given slave core may require processing resources not possessed by the designated slave core. Thus, a filtering core can accept an instruction, convert it if needed, or send the instruction back to the host processor, master core, or another core if no hard-coded acceptable conversion is available. Further, embodiments can be performed by a hardware system interface that can be a separate component from the cores as will be described below.

Figure 6:
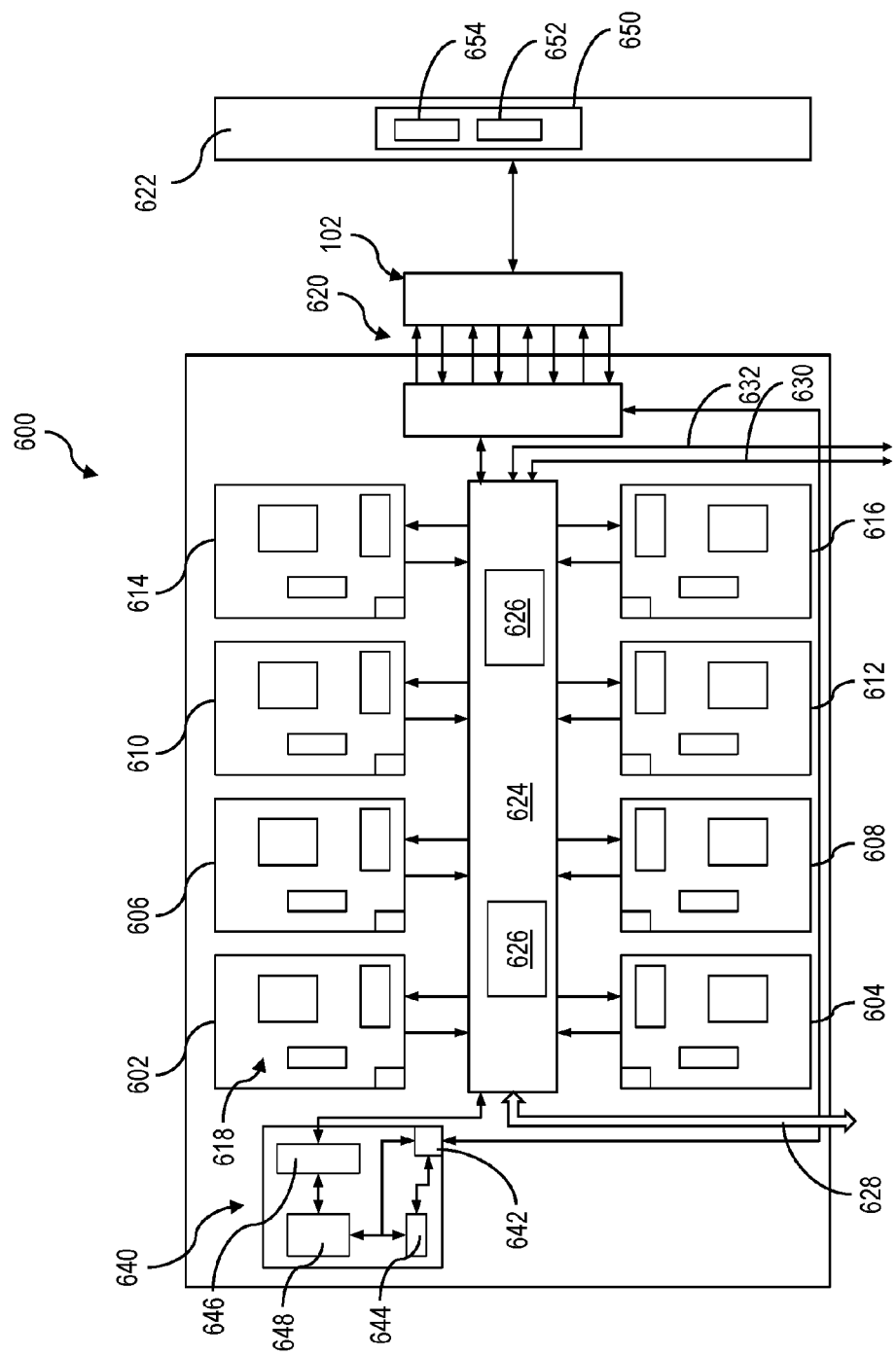
FIG. 6 depicts a block schematic diagram of an exemplary hardware implementation of an interface that can assign instructions to fully functional and partially-functional processor cores in accordance with an illustrative embodiment.

A schematic hardware representation of embodiments is shown in FIG. 6. A computing system or computer system 600, such as a processing unit 106 of FIG. 1, can include a particular number of processor cores 602, 604, 606, 608, 610, 612, 614, 616. Each core can include multiple processing resources 618 and can, for example, take the form of core 200 of FIG. 2, though any other suitable core design can be used in embodiments. While eight cores are shown in FIG. 6, the number of cores can vary and can generally be referred to as C cores (C=8 in FIG. 6), and can include a subset F of cores labeled as failed cores, and computing system 600 can include an indicator of core status. However, some of the F cores may include functional processing resources.

Embodiments can provide an expanded indication of core status so that a core can be good, failed, or partially failed, or, put another way, a core can be fully functional, partially functional, or non-functional. Thus, one or all of the F cores may instead be part of a subset P of partially functional cores. For those P cores identified as partially functional, embodiments can provide an indicator of available processing resources for each partially functional core. For example, if a core has a failed fixed point execution unit but still has a functioning floating point unit, embodiments can indicate this remaining functionality.

Computing system 600 can include one or more memory interface units 620 that can couple computing system 600 to one or more system main memory devices 622. For example, system main memory 622 can include main memory 108 of computing environment 100 of FIG. 1 via NB/MCH 102, though any other suitable arrangement can be used. Memory interface unit(s) 620 in embodiments can include a memory controller 102 of FIG. 1 and/or a memory buffer, though other arrangements can be used as may be appropriate and/or desired. Memory interface unit(s) 620 can be connected to processor cores 602-616 via a system interconnect 624, which can also include additional memory devices 626, such as additional cache memory or the like. In embodiments, computing system 600 can include one or more SMP links 628 coupled to a supervisory device or program of a larger computing environment in which computing system 600 is deployed, such as computing environment 100 of FIG. 1. In addition, embodiments can include an off-MCM link 630 and an I/O link 632.

A system interface 640 can be introduced in embodiments that can assign a current instruction to a core based on workload of the C cores, available processing resources in the P cores, and the nature of the current instruction. Where an instruction is of a first type and an available P core does not have a suitable execution unit or other processing resource, embodiments can include a converter or translator, such as a just-in-time (JIT) compiler, that can convert a current instruction into one or more converted instructions compatible with the available P core. In embodiments, such a converter or translator can be hard coded into system interface 640 or elsewhere in computing system 600.

With continued reference to FIG. 6, system interface 640 can include a first circuit 642 in communication with or coupled to memory interface unit 620 so as to receive system information 650 stored in system memory 622. System information 650 can include processor core status indicators 652 and available processing resource indicators 654. In embodiments, available processing resources indicators 654 can be included in processor core status indicators 652 or vice versa or can be separate as schematically illustrated. In addition, available processing resources indicators 654 can be provided for all of processor cores 602-614 regardless of functionality.

System interface 640 can also include a second circuit 644 in communication with or coupled to first circuit 642 and can include components and/or code and/or instructions to determine what processing resources are needed to process the current instruction received by first circuit 642. A third circuit 646 can be connected to the plurality of processor cores 602-616, such as via system interconnect 624. A fourth circuit 648 in communication with or connected or coupled to first circuit 642, second circuit 644, and third circuit 646 can receive information from first circuit 642 and second circuit 644. Fourth circuit 648 can assign the current instruction to a processor core via the third circuit 646 in response to the needed processing resources, the status indicators, and any available processing resources indicators received via the first and/or second circuits 642, 644. While system interface 640 has been described as including a particular number of circuits, it should be clear that one or more of circuits could be merged, and/or one or more of these circuits could be split into multiple additional circuits, as may desired and/or suitable.

To provide the indicators used in embodiments, a final test can be modified to detect failed processing resources within processor cores. For example, predefined values can be loaded into input latches or flip-flops of each core of a device under test. The predefined values can be selected to produce particular expected output values according to the device under test when driven through cones of logic to output latches. The actual values of the output latches can be read out and compared to the expected values. If this comparison reveals a mismatch between actual value and expected value, a fail has been detected. Ordinarily, this would result in a core being labeled as "failed" and not used in operation. However, each latch can be associated with a particular processing resource, execution unit, or other component of the device under test, and so can include data about how a core has failed. For example, the name of the fail-detecting latch can include one or more characters that indicate which unit(s) has failed, e.g. FXU for fix point unit, LSU for load store unit, or MCU for memory control unit. The names of the latches or any other identifiers associated with specific latches can thus be used as an indicator of available processing resources, but can also be used to indicate partial or non-functionality of a core should separate indicators of functionality and available processing resources not be desired.

Thus, the illustrative embodiments provide mechanisms for scheduling application tasks among processor cores that are fully functional, partially functional, and non-functional while giving the best tradeoff possible among system throughput, application performance, and energy consumption.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

In light of the description above, it should be understood that embodiments can be implemented in various fashions and at many levels within a computing system. For example, in a per-core implementation, an OS dispatcher/scheduler can start execution on a core not taking partial functionality into account. The core can determine how to handle instructions it receives, such as by directing an instruction to a functional execution unit or by emulating a missing execution unit. In this example, the OS need not receive any information about available processing resources within the cores since the cores themselves take care of the instructions they receive. In addition, indicators of available processing resources of cores can be omitted apart from each core keeping track of failed components internally.

As another example, software and hardware can cooperate by using attribute codes to indicate what processing resources a particular program will demand. During compiling of the program, such codes can be passed into compiled output that can be combined with other compiled output, such as with a Binder or Linkage Editor, into an object, such as a Load Module, that can be loaded into the computing system. When the object is executed, the computing system Loader can copy the Load Module into memory and indicate what processing resources the program will demand, such as in one or more tables. During execution, the OS dispatcher can check the attribute codes to determine which cores should be used. The OS dispatcher thus can consider available processing resources in each core. It may also be advantageous to combine aspects of this example with the previous example.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
a plurality of processor cores coupled to a system interconnect, each processor core having processing resources including a plurality of execution units;
a system memory, a memory interface unit coupled to the system memory, the memory interface unit including a memory controller, and the memory interface unit coupled to the system interconnect; and
a system interface coupled to the system interconnect to:
determine a status of each processor core, the status including one of fully functional, partially functional, or non-functional;
determine available processing resources for any partially functional processor core;
receive a current instruction via the memory interface;
determine what processing resources are needed to process the current instruction; and
convert, using a just-in-time (JIT) compiler, the current instruction to at least one converted instruction compatible with a processor core that lacks a processing resource otherwise required to process the current instruction.

2. The computer system of claim 1, wherein the system interface includes a scheduler that finds a processor core including processing resources compatible with the current instruction based on the respective available processing resources.

3. The computer system of claim 1, wherein the status of each processor core is written to a respective status indicator on a portion of the system memory after a final test of the computer system.

4. The computer system of claim 1, wherein a respective indicator of the available processing resources of each partially functional execution unit is written to the system memory after a final test of the computer system.

5. The computer system of claim 1, wherein each available processor core is monitored and respective indicators of status and available processing resources are updated in response to a processor core having a change in available processing resources.

6. The computer system of claim 5, wherein an initial status of each processor core is written to a respective initial status indicator on a portion of the system memory after a final test of the computer system and each updated indicator is stored in a read-write portion of the system memory.

7. A method comprising:
reading information about each of a plurality of processor cores in a computing device, the information including:
an indicator of functionality, the indicator showing its respective processor core is one of fully functional, partially functional, or non-functional; and,
for any partially functional core, a respective indicator of available processing resources;
receiving a current instruction from a memory of the computing device;
determining what processing resources are needed to process the current instruction;
converting using a just-in-time (JIT) compiler, a current instruction to at least one converted instruction compatible with indicated available processing resources of a particular partially functional core; and
assigning the at least one converted instruction to the partially functional core.

8. The method of claim 7, further comprising monitoring available processing resources of any functional processor cores and of any partially functional cores and updating a respective indicator of any monitored processor core that has a change in available processing resources.

9. The method of claim 7, further comprising determining that the partially functional core does not have processing resources compatible with the current instruction.

10. The method of claim 9, further comprising estimating a processing time with using the partially functional core; and estimating the processing time without using the partially functional core.

11. A system interface for a computer system having a plurality of processor cores, the system interface comprising:
a first circuit connected to a memory interface of the computer system, the memory interface being coupled to a system memory of the computer system, the first circuit receiving a current instruction of a task stored in the system memory, the first circuit also receiving a respective status indicator stored in the system memory, each status indicator indicating that a respective processor core is one of fully functional, partially functional, and non-functional, the first circuit further receiving, for each partially functional processor core, a respective indicator of available processing resources stored in the system memory;
a second circuit connected to the first circuit to determine what processing resources are needed to process the current instruction;
a third circuit connected to each of the plurality of processor cores; and
a fourth circuit connected to the first, second, and third circuits such that the fourth circuit assigns the current instruction received via the first circuit to a partially functional processor core via the third circuit in response to at least the needed processing resources, the status indicators, and at least one available processing resources indicator received through the first circuit, wherein the fourth circuit includes a just-in-time (JIT) compiler that converts the current instruction to at least one converted instruction compatible with a processor core that lacks a processing resource otherwise required to process the current instruction.

12. The system interface of claim 11, wherein the fourth circuit enables a scheduler to find a processor core compatible with the current instruction based on the respective available resources.

13. The system interface of claim 11, wherein the status indicators in the system memory are included in a portion of the system memory responsive to results of a final test of the computer system.

14. The system interface of claim 11, wherein any available processing resource indicator is included in a portion of the system memory responsive to results of a final test of the computer system.

* * * * *